INVENTOR.
CHESTER A. PURDY
BY
McNenny, Farrington, Pearne & Gordon
ATTORNEYS

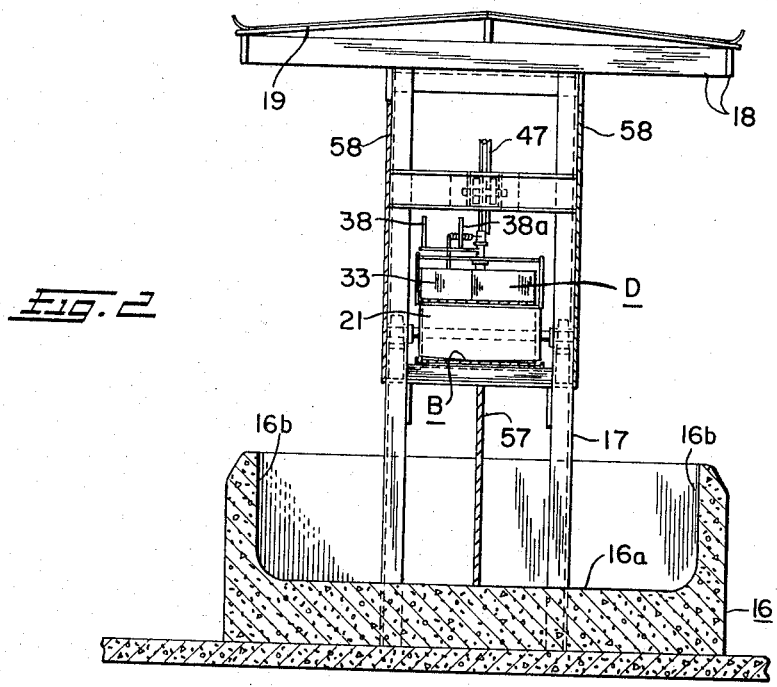
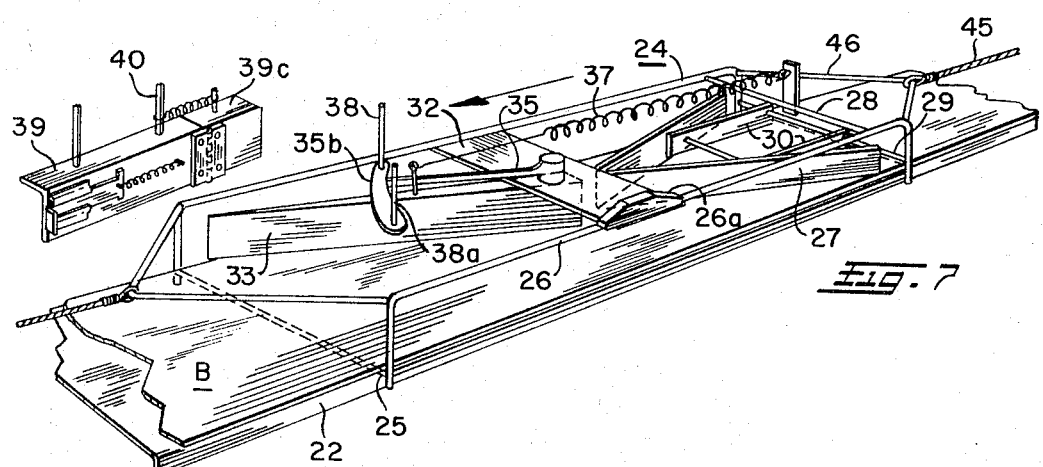
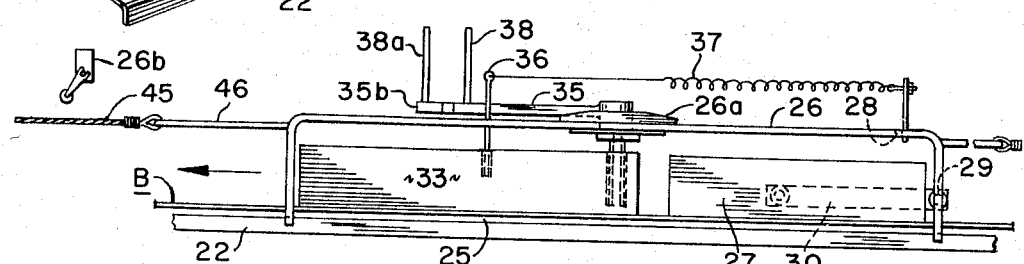

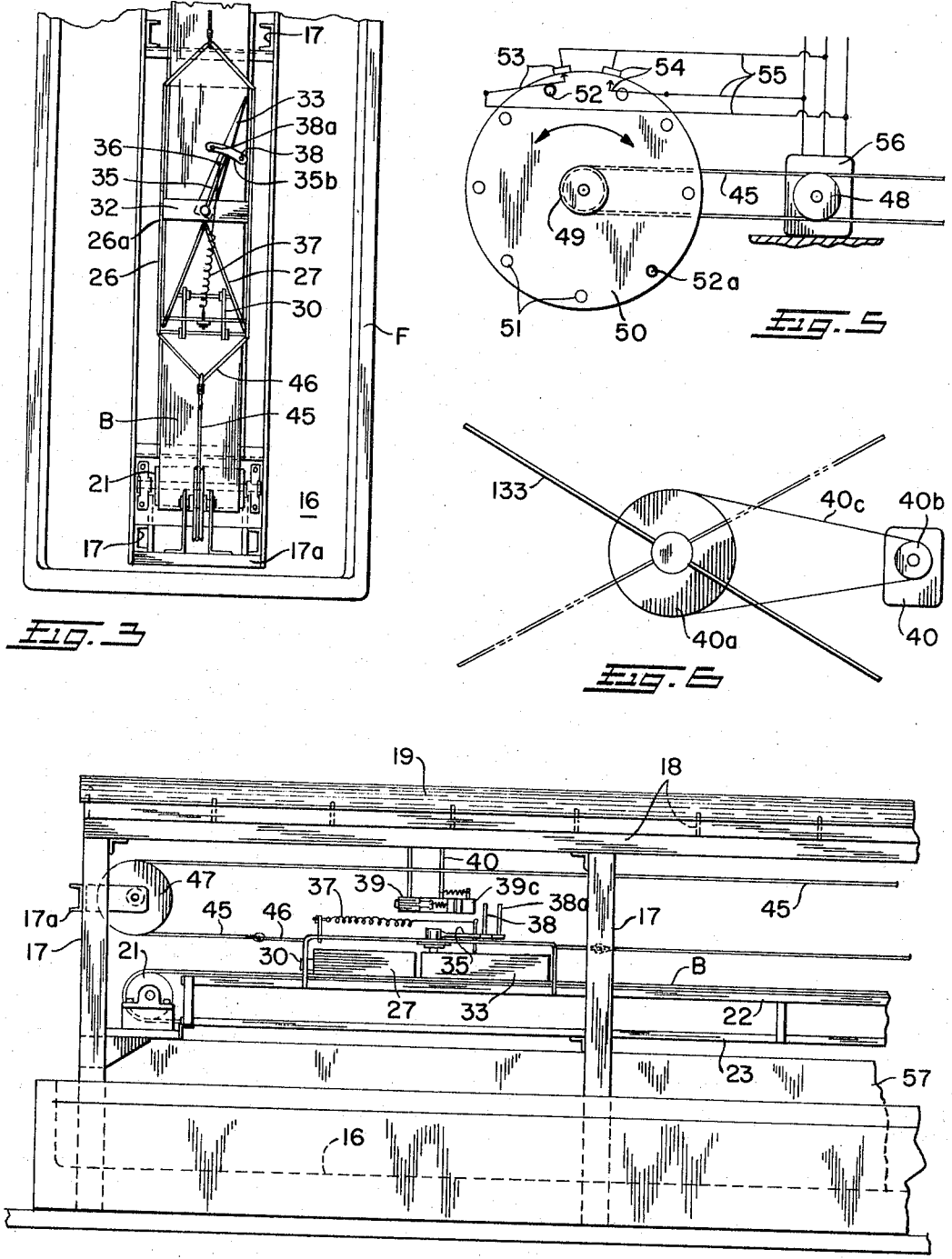

Feb. 28, 1967   C. A. PURDY   3,306,261
FEED DELIVERY METHOD AND APPARATUS
Filed Aug. 31, 1964   5 Sheets-Sheet 4

INVENTOR.
CHESTER A. PURDY
BY
McNenny, Farrington, Pearne & Gordon
ATTORNEYS

Feb. 28, 1967   C. A. PURDY   3,306,261
FEED DELIVERY METHOD AND APPARATUS
Filed Aug. 31, 1964   5 Sheets-Sheet 5

INVENTOR.
CHESTER A. PURDY
BY
McNenny, Farrington, Pearne & Gordon
ATTORNEYS

United States Patent Office 3,306,261
Patented Feb. 28, 1967

3,306,261
FEED DELIVERY METHOD AND APPARATUS
Chester A. Purdy, R.F.D. 1, Belmont, Wis. 53510
Filed Aug. 31, 1964, Ser. No. 393,172
26 Claims. (Cl. 119—56)

The present invention relates to improved methods and apparatus for delivering a load or burden and, more particularly, to a method and apparatus for uniformly delivering and discharging animal feed into a feedbunk or the like.

Although the mechanized planting and harvesting of farm crops have taken long strides within recent years, there has not been a commensurate reduction in the labor involved in the daily feeding of farm animals. For large herds this can be a formidable task.

Normally, a farm wagon carries animal feed for hand delivery into a feeding bunk at intervals along its length. This is obviously quite time and labor consuming. Augers have also been used to advance animal feed lengthwise of a feedbunk However, the equipment based on the auger principle is not only more expensive and more difficult to maintain, but such equipment has limited capacity and speed, and tends to wear rapidly. Also, augers do not work well in moving feed "uphill," although most feedlots are preferably tilted to promote drainage. Further, the feed itself tends to jam auger equipment as well as automatically to undergo segregation with the finer and heavier material, as for example, grain and supplement, falling through openings near the input end of the auger equipment, while the coarser and lighter material moves to the farther end.

In accordance with the present invention, a delivery belt or the like carries the feed directly from a silo or other storage place throughout the length of a feedbunk where, in cooperation with a diverter that traverses a selected portion of the delivery belt path, the feed is discharged from the belt in a uniform manner into the feedbunk. The diverter may, if desired, be mounted to deliver selectively to one side or the other or, alternatively, to both sides. Also, the diverter may be caused to function along all or any part of the length of the feedbunk. Still other advantages are embodied in the present method and apparatus as hereinafter will be apparent.

It is, therefore, a principal object of this invention to provide an improved method and apparatus for delivering a load or burden to an area of use and discharging the load substantially evenly in such area.

Another object is to provide an improved method and appartus capable of distributing feed containing mixed rations of differing textures and particle sizes and shapes without separation or segregation of such rations, so that the mixture components are discharged in the same proportions over the entire length of a feedbunk.

A further object is to provide an improved method and apparatus for delivering feed to a relatively large number of farm animals wherein the apparatus can be mechanized to require a minimum of personnel supervision.

A still further object is to provide a method and apparatus for distributing feed to any preselected section of a feedbunk without necessarily loading the other sections of the feedbunk.

A still further object is to provide a feedbunk structure and feed delivery system having natural protection against windage loss, particularly off the more valuable, fine portions of the feed.

A still further object is to provide a highly flexible and versatile, semi-automatic feeding apparatus, which nevertheless has simply constructed component parts that are readily available to a farmer, with a view to simplifying the problems of replacing parts and of on-the-scene repair and maintenance of the apparatus to the greatest extent possible.

Other objects and advantages will be apparent from the following figures and description wherein:

FIGURE 2 is a transverse section on the line 2—2 of FIGURE 1, illustrating a diverter positioned over a delivery belt;

FIGURE 3 is a fragmentary plan view of the outer end of the feedbunk and diverter of FIGURE 2 with parts removed;

FIGURE 4 is a right hand side elevational view of FIGURE 3, with the upper side baffles removed, showing the roof structure;

FIGURE 5 is a fragmentary, semidiagrammatic view of a control for regulating the length of movement of the diverter along a delivery belt;

FIGURE 6 is a diagrammatic plan view of one manner of changing the angular position of a diverter;

FIGURES 7 and 8 are enlarged perspective and side elevational views, respectively, of one form of diverter or plow member having a pivotal mounting;

Figure 15:
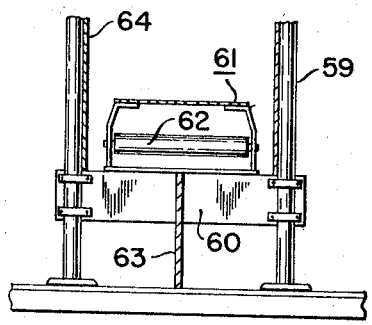
Figure 16:
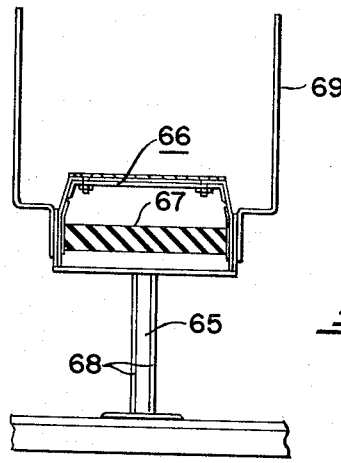
Figure 17:
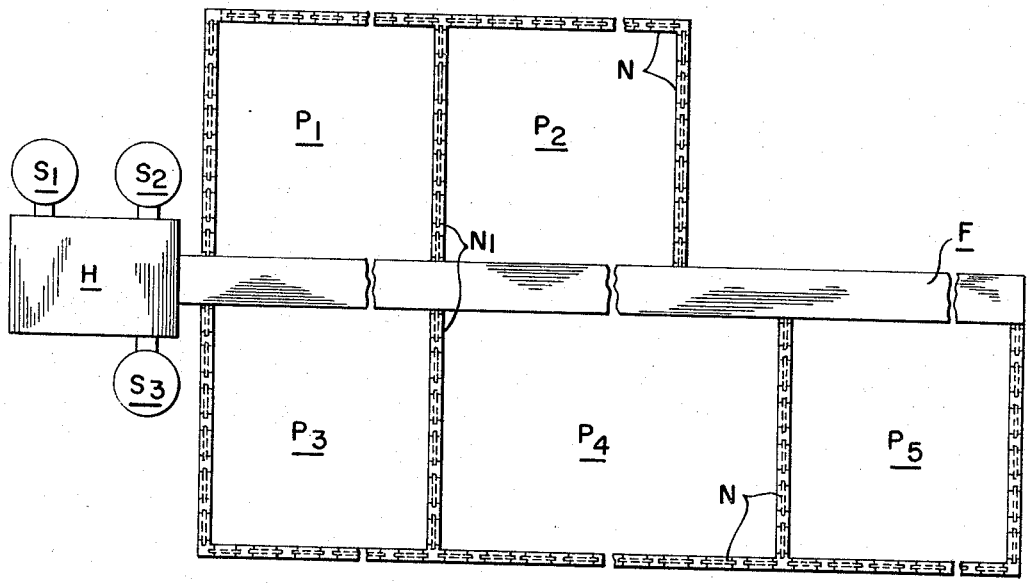

FIGURES 15 and 16 are transverse cross-sections of modified forms of conveyor-supporting structures which can be installed in existing feedbunks; and FIGURE 17 is a diagrammatic layout, in plan, of an illustrative feed yard comprising an arrangement of several feed pens adjacent a feed distributing conveyor and feedbunk system of the invention for the controlled, selective distribution of feed from any or all of a number of silos or other storage or supply units to any or all of the several pens according to varying needs from time to time.

In general, the present invention embodies transporting a burden or the like on a conveyor, such as a continuous belt, moving unidirectionally over a predetermined distance. Simultaneously, a diverter resting lightly on the belt of its own weight or otherwise pressed lightly against the belt is reciprocated back and forth through this predetermined distance. The relative speeds of the conveyor and reciprocated diverter are coordinated in the preferred embodiment so as to engage the diverter with the burden during both directions of the diverter's reciprocation in order continuously to discharge the burden laterally of the conveyor. If the "ground" speeds of both the diverter and conveyor are constant, the diverting or plowing rate changes upon reversal of direction of the diverter. This change may be minimized by varying the diverter's speed to compensate for such reversals of direction or merely to adjust, as may be desired, the rate of discharging the burden.

The diverter normally embodies a plow which is angularly positioned with respect to its direction of travel to effect a lateral discharge of the burden from the conveyor. Optionally, this angular position can be periodically reversed so as to discharge the burden from alternate sides of the conveyor. A control may also be employed to vary the length of travel of the diverter within its maximum limit of horizontal linear travel.

Structure

Figure 1:
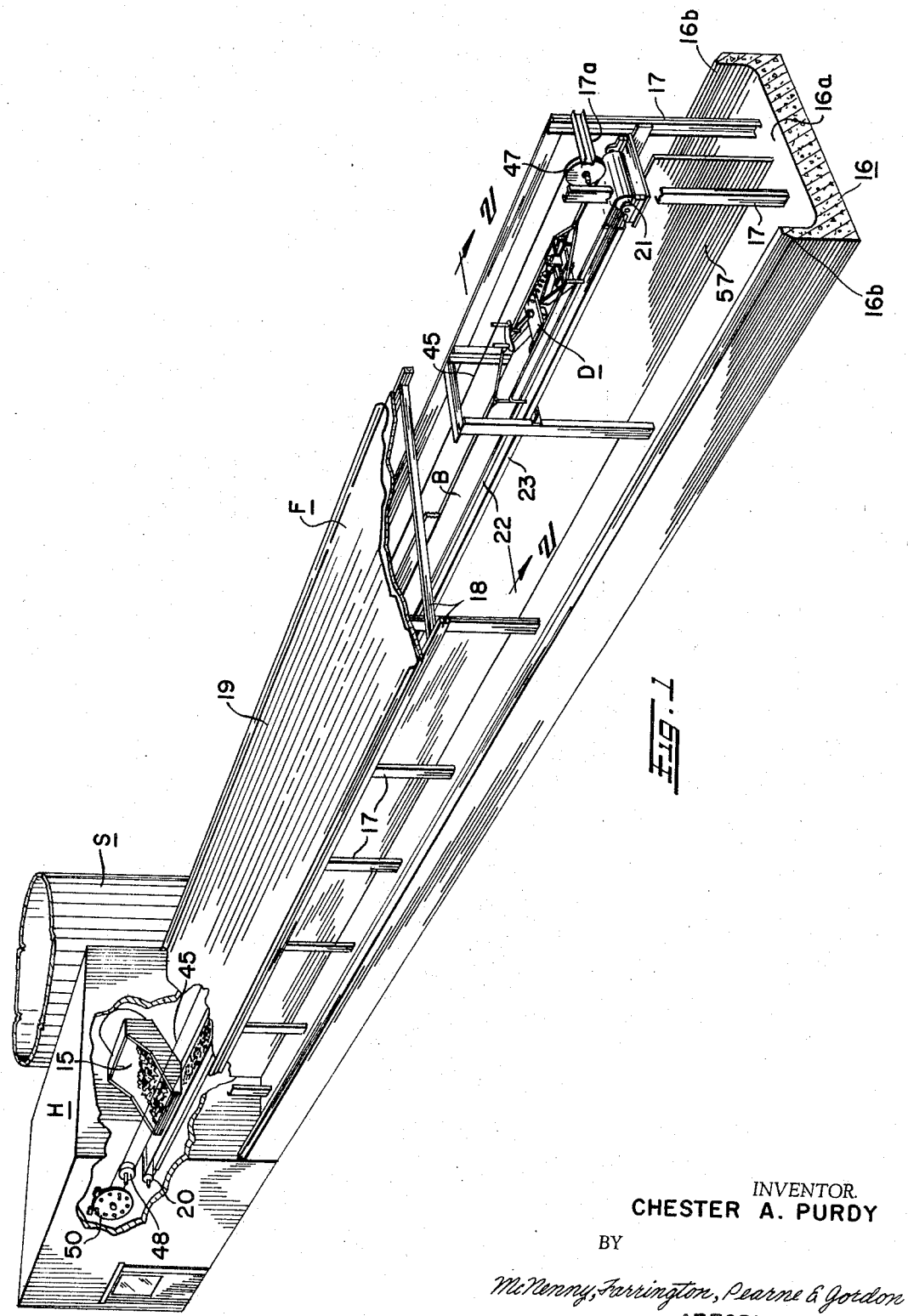
FIGURE 1 is a perspective view of one form of the present delivery apparatus with parts removed.
Figure 9:
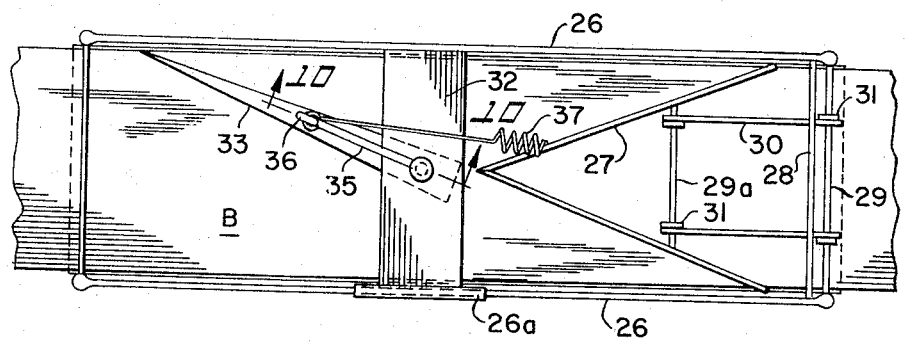
FIGURE 9 is a diagrammatic plan view of the right hand portions of the diverter of FIGURES 7 and 8, showing the floating arrangement of a rearward deflector.
Figure 10:
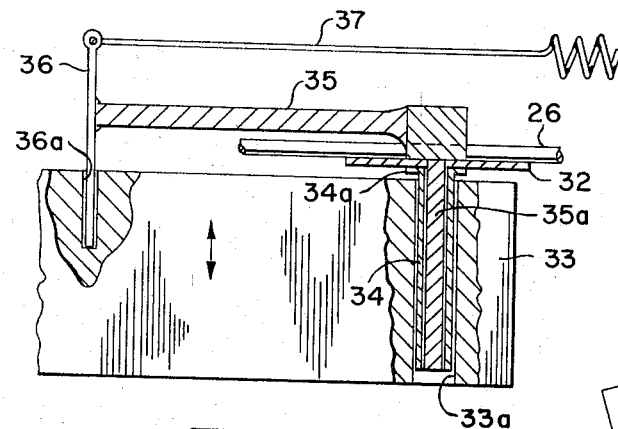
FIGURE 10 is a section of FIGURE 9 on the line 10—10, only certain parts being sectioned for ease of illustration.

Referring principally to FIGURES 1 and 2, a feedbunk F may extend a hundred feet or more from a feed house H adjacent a silo S into a feeding yard. The feedbunk is designed to feed cattle or other animals from either side thereof and may constitute a barrier between separate pens and/or extend along a series of separate pens if desired. (Also, see FIGURE 17 referred to in more detail hereinafter.)

The major portion or all of the feed to be supplied to the delivery system is normally delivered onto a load carrying reach of a flat conveyor belt B through a chute 15 or by supplementary conveyor (not shown), or the like, advancing feed from the source of supply S. The belt B carries the feed along the length of the feedbunk F and automatically discharges it to one side or the other, or to both sides alternatively, and at any desired intervals or continuously along the length of the feedbunk.

More particularly, the feedbunk F includes a trough 16 which conveniently may be constructed of precast concrete sections, although any equivalent construction may be used. As shown (FIGS. 1 and 2), the trough 16 is defined by a longitudinally extending bottom portion 16a between laterally spaced, upstanding, opposite side walls 16b. A series of posts 17 set into the concrete, or rigidly mounted thereon in any desired manner, are spaced longitudinally of the trough 16 and carry beams 18 which in turn support a roof 19. A roller or "head pulley" 20 mounted at one end of the conveyor and a similar roller 21 mounted at the other end of the conveyor carry the continuous delivery belt B. A pair of horizontally disposed beds or platforms 22 and 23, having side margins turned toward each other, are supported by the posts 17 and extend for about the entire horizontal length of the belt B. The platforms 22 and 23 may partially support and guide the upper and lower flights, respectively, of the belt. The belt B may be conventionally and continuously driven, as by an electric motor (not shown) suitably coupled to a shaft of one of the rollers 20 or 21.

A diverter, generally indicated at D, overlies the upper flight of the belt B and reciprocably moves back and forth along a substantially planar discharge reach of the load carrying upper flight of the belt. The discharge reach may constitute the major extent of the horizontal length of the belt B, although the diverter travel can be adjusted for shorter distances of travel as hereinafter described. As illustrated, especially by FIGURES 7 and 8, the diverter D may comprise a frame or carriage, generally indicated at 24, including a bottom plate 25 over which the belt is threaded and having tubular, inverted U-shaped sides 26 defining lateral openings for the discharge therethrough of animal feed.

If the diverter plow or like member is held away from the surface of the belt by even a small amount, fine material is not diverted but continues on with the belt. An even more serious difficulty results from intermediately sized fibrous material becoming wedged in any opening between the diverter member and belt, building up in front of the diverter member to a point of interfering with or preventing even a normal diverting action. The diverting action is of course dependent upon the differential in friction forces between that of the animal feed against the belt and that of the feed against the diverting member. A highly successful operation has been obtained when the relatively light diverter member is permitted to ride freely upon the belt, restrained only against the thrust of the material and the belt, and the load carrying reach of the belt is uninterruptedly planar as shown.

FIGURES 7 to 10 illustrate one preferred form of the diverter wherein the belt is threaded between a base or bottom plate 25 and a diverting structure designed to ride in contact with the belt but in a floating, vertically moving fashion. Referring to these figures, a V-shaped deflector 27 is flexibly held adjacent one end of the frame 24, so that the deflector rests lightly on the belt B. A cross-strip 28 and a hinge pin 29 connect downwardly turned ends of the tubular sides 26. Bars 30 are free to pivot on pin 29 as on a forward pivot pin 29a fixed at its ends to the diverging sides of the deflector 27. Collars 31 retain the bars 30 in position on the pins 29 and 29a. In this manner the deflector 27 and assembly are free to pivot in a vertical direction about the rear pin 29.

Another cross-strip 32 carried by the tubular sides 26 pivotally supports a vane or plow 33 adjacent the opposite end of the frame 24 for swinging actuation about an axis substantially normal to the plate 25 and located forward of the apex of the V-shaped deflector 27. The vane 33 is thus adapted to assume a plurality of angular positions with respect to the length of the belt B and is especially adapted alternatively to pivot between two side positions of linear alignment, respectively, with the diverging sides of the V-shaped deflector 27. The vane 33 is constructed in the form of a narrow based triangle and is provided with a bore 33a near the base to receive a hollow shaft 34. The hollow shaft 34 has a collar 34a at its upper end and is suitably secured to and supported by cross-strip 32. The bore in vane 33 fits loosely on shaft 34 so that vane 33 may fall freely and like the deflector 27 rest lightly on the belt.

Atop the cross-strip 32, an enlarged end of an arm 35 is fixed to a pivot pin 35a which extends downward into the hollow shaft 34 and is suitably journaled therein. The arm 35 extends in line with the vane 33 and terminates in a horizontal T section 35b. A vertical pin 36 extends through and is fixed to the arm 35 near the T section, telescopically entering with a loose fit into a bore in the top of vane 33. A coil spring 37 connects an upward extension of the pin 36 to the far end of the frame 24, as illustrated, for urging the diverter toward either of its alternate side positions from a dead center position.

Figure 11:
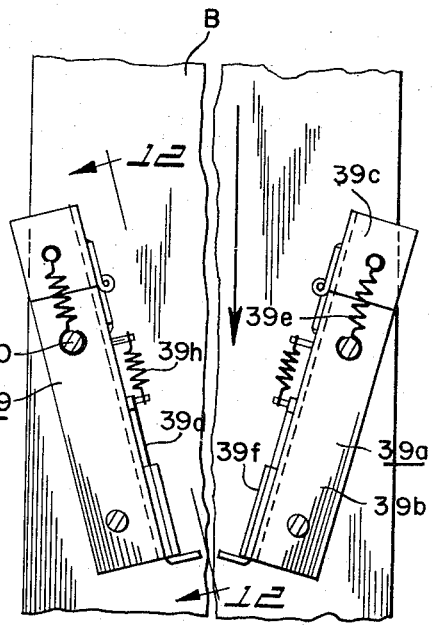
FIGURE 11 is a plain view of cam means preferably used with the diverter of FIGURES 8 and 9.

The T section 33a carries at its ends two vertical pins 38 and 38a, which are engageable with cam means located at either end of the "run" of the diverter D. The cam means may take the form of an angle iron 39, suitably supported from the frame structure by rods 40 at a longitudinal angle, so that the outer face of the vertical flange (FIGURE 7) may engage the pin 38 to actuate the vane from right to left when facing in the direction of the arrows (FIGURE 7 and FIGURE 8). As shown in FIGURE 11, an opposing cam 39a of the same structure as cam 39, except for being a mirror image, is placed at a complementary angle directly opposite to cam 39 so as to engage pin 38a and actuate the vane from left to right, when facing in the direction of the arrows. With this arrangement of pins and cams, movement of the diverter is the only source of power required to actuate the vane 33 from side to side.

Figure 12:
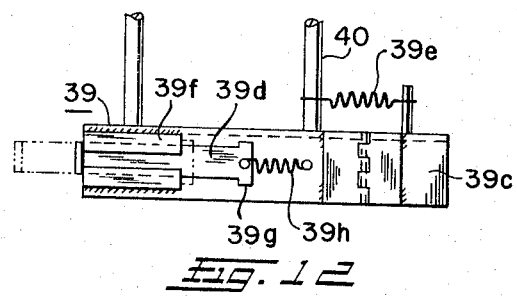
FIGURE 12 is a view of a cam of FIGURE 11 taken on the plane of the line 12—12.

Cams 39 and 39a are each constructed in three sections, namely (FIGURES 11 and 12), a normally fixed section 39b (held by the rods 40), a hinged section 39c, and an L-shaped extensible section 39d which is normally retracted by the spring-return 39h. A coiled spring 39e secured to a rod on the fixed section and to a pin on the hinged section normally holds those parts in the position shown in FIGURE 11. Strips 39f (FIGURE 12) form a longitudinally extending slot which receives the extensible section 39d. The latter has a transversely enlarged stop portion 39g which prevents complete removal of the extensible section from between the strips 39f as illustrated in FIGURE 12 in phantom. This arrangement of cams provides actuation of the vane as desired without interference from the opposing cam as hereinafter more fully described. If it is desired to divert to one side only, either cam 39 or 39a is simply lifted out of position. Cams like cam 39 or 39a may be removably mounted at various stations along the upper flight of the belt B, so that the pivoting action of the vane 33 may be accomplished when desired to divert material to either side and over any segment covered by the overall maximum horizontal travel of the diverter.

As an alternate to the cam actuation of the vane or plow 33, the embodiment of FIGURE 6 may be used. In this schematic illustration, the vane 133 is pivotally mounted as before, but a frame carries a small, fractional horsepower, reversible, electric motor 40 with a vertically disposed drive shaft. By means of pulleys 40a and 40b and a cord belt 40c, the motor 40 may turn the vane 133 in either direction between the limiting positions shown. The wiring for the motor 40 may be movably carried by pulleys, or by line and trolley, into the house H to a source of electrical power by which the motor may be actuated as desired with the aid of known switch means.

Referring generally to the diverter structure, there results from the various structural features shown, a number of advantages for the distribution of animal feed, such as:

(1) A track or guide for the entire diverter equipment providing virtually perfect registration without additional structural cost.

(2) A flat surface over which the belt travels, so that the belt surface is also flat thus providing, in turn, a flat surface upon which the floating diverter structure rides.

(3) A side guide or restraining means for the belt which centers the belt beneath the diverter equipment and simultaneously resists the side thrust created by the movement of the material being unloaded.

Figure 13:
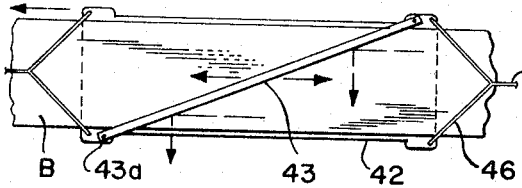
FIGURES 13 and 14 are plan views of other forms of diverters which do not pivot.
Figure 14:
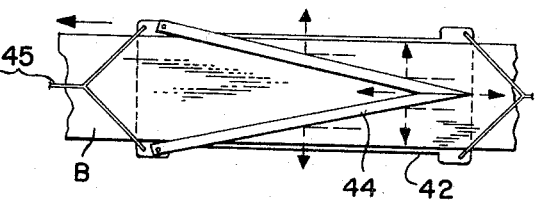

Although generally preferred, it is not necessary that the vane or plow member pivot. As shown in FIGURES 13 and 14, the angularity of the plow or diverter plates can be fixed, the plates being preferably supported so as to ride freely on the belt. The belt B is also threaded between the baseboard and the diverter plates as in the case of the embodiment of FIGURES 7 and 8. In FIGURE 13, the plow 43 is a straight plate extending diagonally across the baseboard 42 and adapted freely to move in a vertical direction on pins 43a in oversized holes. The baseboard 42 carries the pins 43a. In this case the diversion of feed is always to one side, as illustrated by the laterally directed arrows. In FIGURE 14, the plow 44 is V-shaped and, if desired, can also be carried in floating fashion. In this case, diversion is always to both sides of the belt B, as indicated by the laterally directed arrows.

The angularity of the deflecting plates of any embodiment, with respect to the center line of the conveyor, must be such as to divert with fair certainty a variety of materials having various coefficients of friction and degrees of comminution, ranging from, for example, finely ground feed stuffs to coarsely chopped fibrous materials, such as corn silage or haylage. Preferably, the maximum angle for satisfactory operation is about 45 degrees, while the minimum angle is controlled by the structural and operating considerations, such as the length of the diverter. The optimum angle is of the order of 20 degrees.

Regardless of the specific structure of the diverter, power means are provided to reciprocate it back and forth along and substantially coexistensively with the upper flight of the belt B. In the embodiment of FIGURES 1, 3, and 4, for example, opposite ends of a continuous cord or cable 45 are respectively secured by end loops to a pair of bridle wires or rods 46 connected to opposite ends of the frame 24. The cord or cable 45 is trained around a pulley 47, rotatably supported by a cross beam 17a carried by the outmost posts 17 and a capstan pulley 48 suitably mounted within the house H. If desired, a standard pulley can replace the capstan, and any suitable power means may be employed reversibly to pull the diverter back and forth as indicated. However, the capstan is preferred in one embodiment in order more conveniently to adapt the drive for the diverter to operate through linear distances less than the entire horizontal length of the conveyor.

For instance, after making one or more loops about the capstan 48, the continuous cable or cord 46 is trained about a pulley 49 drivingly connected to a rotatable cam disc 50 having a circumference related (as described below) to a preselected maximum distance of travel of the diverter, such as the maximum horizontal length of the portion of the conveyor belt extending above the feedbunk. A plurality of holes 51 are spaced along the periphery of the disc 50, the spacing of these holes corresponding to the spacing of other diverter starting and terminal points along the discharge reach of the belt at which the diverter travel may desirably be reversed and which may be selected for programming the system of the invention to carry out a desired pattern or sequence of feed distribution. This relationship also involves the rate of rotation of the cam disc 50, which should be connected or geared to its drive pulley 49 to impart up to a few degrees less than one revolution to the cam disc during travel of the diverter over the aforementioned preselected distance.

One or more pins 52, serving as switch-actuators, are removably placed in selected holes 51 of the cam disc 50. Normally, open switches 53 and 54, which conveniently can be limit switches, are located to one side of the disc 50 in a position to be tripped by a switch-actuating pin 52. The switches 53 and 54 and attendant circuitry 55 are connected so as to actuate either suitable mechanical means or a standard, reversible, electric motor 56 which drives the capstan 48 (normally through a constant speed reduction means). The nature of such circuitry is well understood in the art and, therefore, is only illustrated schematically in FIGURE 5 and not described here in detail. More sophisticated circuitry may obviously be used. If desired, the motor 40 of FIGURE 6 can be connected in the circuitry of FIGURE 5 with an electric timer, so that for each reversal of motor 56, motor 40 operates briefly in a direction opposite to a previous direction to swing the plow 133 to another pivotal position. Or, in place of the electric timer, current to the motor 40 can be interrupted by having the plow 133 strike a limit switch on the frame of the diverter.

As a still further modification, the reciprocation of the diverter can be effected by a cam 26a carried by a side 26 of the frame. This cam 26a may trip any number of limit switches 26b (FIGURE 8) which may be supported on posts 17, or the like, at strategically located stations along the feedbunk where it may be desired to reverse the direction of movement of the diverter D; and a switching panel (not shown) may be employed with conventional circuitry for selectively rendering the limit switches operative at any two locations where diverter reversal may be desired.

The present feedbunk also includes certain novel structural features which are particularly useful in combination with the previously described belt and diverter structures. Referring to FIGURE 2, for example, a substantially vertical baffle or partition 57 extends from below the belt B to the bottom of the trough 16 and runs substantially the length of the trough and centrally thereof. This partition extends upwardly from the bottom portion 16a of the trough 16 to a height greater than that of the trough side walls 16b for dividing the trough into two laterally spaced feeding compartments that respectively receive feed discharged from opposite sides of the belt B. Thus, feed supplied to animals feeding from the compartment on one side of the trough is kept separate from feed supplied to animals feeding from the opposite side of the trough, and the same central partition 57 further serves as a baffle for deflecting wind that might otherwise blow feed from one side of the feedbunk to the other or entirely out of the feedbunk. Baffles 58 are also desirably mounted on the posts 17 on opposite sides of the conveyor and diverter assembly so as simultaneously to diminish loss of animal feed from the belt by windage, to prevent animals from touching the belt or diverter, and to constitute a barrier leaving a lateral clearance from the outer trough sides that is too small to permit animals to climb directly into the trough 16 yet great enough to prevent animals from rubbing their rear quarters on the structure thus discouraging the animals from standing in a position to foul the feed with excrement. As shown in FIGURES 1 and 2, the entire feed conveying mechanism, including the lower belt supporting platform 22, is disposed above and in engagement with the upper edge of the partition 57 and extends laterally to either side thereof toward the trough side walls 16b. The baffles 58 are dimensioned to extend longitudinally of the trough 16 and vertically from below the level of the upper, load carrying reach of the conveyor belt B, from which feed is discharged, to as great a height above that level as may be desired or necessary to shield the burden on the belt and the downwardly falling feed from wind and to shield the conveyor and diverter or deflecting means from being contacted by livestock feeding at the feedbunk. The baffles 58 are also spaced outwardly from the conveyor to permit feed to be discharged laterally from the conveyor to either side thereof and to fall between the conveyor and the baffles into the troughs of the feedbunk. As best shown in FIGURE 2, the conveyor laterally overhangs the central partition 57 on both sides thereof, and the baffles 58 are disposed still further outwardly and above the feedbunk to prevent animals from climbing into the bunk while permitting them access to feed in the troughs.

FIGURES 15 and 16 illustrate modified feedbunk structures and show only the conveyor supporting mechanism that is installed along the center line of the trough 16, the feedbunk being otherwise the same as or similar to that shown in FIGURE 1. While the conveyor supporting structure shown in FIGURE 1 illustrates a method of installing the support posts 17 directly into the concrete of the feedbunk at the time the concrete is poured, this often is impracticable, and modified forms illustrated by FIGURES 11 and 12 are more advantageous.

In FIGURE 15, vertically extending posts 59 are spaced along the length of the trough on opposite sides thereof, and supporting cross-plates 60 extend transversely of the trough. The cross-plates 60, in turn, carry means to support the conveyor which, in this embodiment, includes a housing 61. The upper surface of the housing serves to underlie the top flight of a continuous belt for carrying feed and the like, while rollers 62, extending internally across the housing 61, are rotatably carried by its sides and serve to support the lower, return flight of the belt. A substantially vertical baffle or partition 63 extends vertically from the housing 61 to the bottom of the trough and longitudinally between successive cross-plates 60. Above the cross-plates 60 and extending from post-to-post on opposite sides of the housing are additional baffles 64. The baffles 63 and 64 perform the same functions as the baffles 57 and 58, respectively, of the embodiment of FIGURES 1 and 2.

In FIGURE 16, single posts 65 are spaced substantially in-line centrally along the length of a trough and carry a belt-supporting structure comprising a housing 66. The upper surface of the housing 66 may constitute a suitable wear plate underlying and supporting the upper flight of a continuous belt. In place of the rollers in the embodiment of FIGURE 11, a succession of spaced internal blocks 67 may be transversely disposed within the housing 66 to support the return flight of the belt. Substantially vertical baffles or partitions 68 extend from the housing 66 to the bottom of the trough and are fixed to the in-line posts 65 along the length of the trough. Similarly, outwardly offset baffles 69 are mounted on opposite, longitudinal sides of the housing 66. The baffles 65 and 69 reduce loss of the feed due to windage and, in addition, the baffles 69 prevent animals from climbing into the trough.

*Operation*

In operation, silage or haylage, optionally with admixed feed supplements, such as corn and commercial concentrates, cascades from the silo S or is fed by an auxiliary conveyor onto the belt B. Suitable power means (not shown) drives pulley 20 or 21 so that the upper flight of the belt moves away from the silo carrying with it the feed material. This action of the belt is continuous throughout the delivery of the feed material, the belt riding atop the bed 22 on its outer travel and atop the bed 23 on its return trip in the embodiments of FIGURES 1 to 8, or as described above in the other embodiments.

When the flow of feed has begun, the motor 56 is started for driving the diverter D out and back, so as to discharge the feed laterally from the belt and into the trough 16. In the preferred embodiment, the diverter so deflects the feed during both directions of travel, although at different rates per unit of time (not necessarily per foot of bunk) according to the speed control for the diverter. On its outward trip (toward pulley 21), the diverter diverts the feed at a rate determined by the difference between the belt speed and the diverter speed. On its inward trip (toward capstan 48), the diverter necessarily "backs" into the feed and similarly diverts it at a higher rate determined by the sum of the belt and diverter speeds. Adjustment of the outward and return speeds of the diverter may be accomplished automatically by means known in the art, or by manual means. In any case, it will be noted from FIGURE 9, that the pivot of the plow is sufficiently ahead of the apex of the deflector 27 that the feed material, in passing the pivot, strikes on the sides of the deflector and does not accumulate at the apex.

If the diverter is to travel its maximum horizontal distance, only one pin 52 need be mounted on the cam disc 50, and a hole 51 is selected for the pin so that a switch 53 or 54 is closed when the diverter is at either extreme of its horizontal travel. However, when a shorter distance of travel is desired, two pins are placed in cam disc holes 51, their circumferential spacing and locations being selected to correspond to the portion of the trough 16 to be traversed by the diverter. For example, assuming a second pin 52a is used and the disc 50 is about to be reversed by the pin 52 engaging the switch 53 to start a counterclockwise rotation of the disc as viewed in FIGURE 5, the pin 52a will strike the switch 54 in due course, thereby reversing the disc rotation to a clockwise direction. This movement continues until the first pin 52 again engages the switch 53, whereupon the operation as just described is repeated. Obviously, these movements of the disc 50 are of lesser magnitude than when just one pin 52 is used alternately to engage both switches 53 and 54, and a correspondingly shorter distance of travel of the diverter D along the trough 16 results. In this manner, the diverter D can be caused to reciprocate back and forth along any part or all of the length of the feedbunk between preselected points along the discharge reach of the belt, while continuously discharging feed.

If a pivotal diverter is being used, cams like the cam 39 and/or 39a can be selectively and removably stationed along the trough at desired "turn-around" points for the diverter and at any desired intermediate point in order to pivot and shift the vane or plow 33 at such points. The pivotal plow 33 is normally held as indicated (FIGURES 7 and 8) by the coiled spring 37 in any particular shifted position. The vane 33 moves through a dead center position while being shifted, at which point the spring 37 pulls neither to the right nor to the left. Yet the spring has sufficient pull normally to retain the plow in either operative position and to insure movement of the plow 33 to the other operative angular position, whenever the plow is moved across the dead center position, as by a cam 39.

Considering the operation of the cams of FIGURES 11 and 12 in greater detail and assuming a diverter traveling in the direction of the arrows of FIGURES 7 and 11, pin 38 strikes the hinged section 39c of cam 39 and is forced along the vertical flange of the cam until the pin reaches and extends, if necessary, the L-shaped section 39d. As soon as the center of the vane 33 passes dead center (the central longitudinal axis of the belt), spring 37 pulls the plow or vane the rest of the way to its other angular position. The parts are so relatively positioned that on the return trip of the diverter, pin 38 passes between cam 39 and 39b, while pin 38a hits the vertical flange of the hinged section 39c of cam 39a, pivoting it out of the way to permit the pin 38a to pass. When the diverter again approaches the cams 39 and 39a in the direction of the arrows of FIGURES 7 and 11, pin 38a engages cam 39a in the same manner, and the action as just described is repeated.

Alternatively, the motor and pulley arrangement of FIGURE 6 may be used to pivot a plow member. In any event, any shiftable plow element may be actuated at selected points along and/or at either end of the feedbunk, or remain in either one of its operative positions, as may be desired, to divert feed from the belt B at uniform, controllable rates to either or both sides of the feedbunk, and along all or at only selected parts of the length thereof, according to different feeding plans as the needs arise.

Where a feedbunk is constructed to provide a feed trough on only one side of the bunk, for example, where the bunk runs along a side of only a single feed yard or pen rather than as a divider between two feed yards or pens, discharge of feed to one side only of the conveyor will be desired. In that event, shifting of a diverter will be unnecessary and the non-shiftable diverter of FIGURE 13 may be used to plow feed to one side only. Where it may be desired always to supply feed at the same rate to both sides of a two-sided feedbunk, such as those illustrated and described herein, the non-shiftable diverter of FIGURE 14 may be used. This diverter is especially useful for relatively coarse feeds, for example, grains.

In both of the last two situations, it will be appreciated that the travel of the diverter may also be controlled as described earlier, so that it will divert feed from the conveyor during travel of the diverter in each direction along the conveyor, and at a uniform rate determined by the relative speeds of the conveyor and the diverter. Also, the portions of the length of the feedbunk over which feed is to be distributed may be predetermined by the setting of pins in the cam disc 50 of FIGURES 1 and 5, or by the placement of the limit switches 26b of FIGURE 8, which setting or placement may be easily and quickly altered from time to time as may be desired.

The many advantages of the invention will be better appreciated by reference to the diagrammatic showing in FIGURE 17 of an illustrative feed yard incorporating the present inventions. Such a feed yard might be employed, for example, on a large cattle ranch where several classifications of mature and young cattle are to be fed according to different feeding plans in different pens $P_1$, $P_2$, $P_3$, $P_4$, and $P_5$, defined by fences N. Such a feed yard might also be employed at locations where cattle destined for slaughtering are retained and specially fed for a time to condition them just prior to slaughtering. In the latter situation, also, several classifications of cattle or groups of cattle arriving periodically may require separate feeding according to different plans or programs that are staggered in time. In both situations one or a few of the several pens may be vacant from time to time when it is necessary to supply feed to the other pens. The versatility of the present invention for handling the varying needs of such situations will become more apparent from a brief summary of how the invention may be operated to service the feed yard of FIGURE 13.

For example, the present apparatus may be used to discharge feed optionally, as may be desired, to one or more of the pens of FIGURE 17 according to any of the following distribution schemes. This list is intended to be only exemplary and not exhaustive.

(1 through 5) Diverter reciprocally transverses the length of only one of any of the five pens, $P_1$ through $P_5$, the discharge being only in one lateral direction and only into that selected pen.

(6) Diverter reciprocally traverses the feedbunk F from the house H to the end of pen $P_2$, the discharge being only in one lateral direction and only into pens $P_1$ and $P_2$.

(7) Diverter reciprocally traverses the feedbunk from the house H to the end of pen $P_5$, the discharge being in only one lateral direction and only into pens $P_3$, $P_4$, and $P_5$.

(8) Diverter reciprocally traverses the feedbunk from the house H to the end of pen $P_2$; the plow always pivoting when passing fence $N_1$, so that the discharge is only into the pens $P_2$ and $P_3$ on opposite sides of the feedbunk F.

(9) Diverter reciprocally traverses the entire length of the feedbunk from the house H to the end of pen $P_5$; the plow always pivoting when passing fence $N_1$, so that the discharge is only into the pens $P_1$, $P_4$, and $P_5$ on opposite sides of the feedbunk F.

(10) Diverter reciprocally traverses the feedbunk from the house H to the end of pen $P_1$; the plow always pivoting when approaching fence $N_1$, so that the discharge is alternately into pens $P_1$ and $P_3$ on opposite sides of the feedbunk F.

In addition, other variables may be introduced so as further to enhance the flexibility of operation of the apparatus. For instance, the out and back speeds of the diverter D (with respect to the house H) can be changed to provide different out and back discharge rates of the feed per foot of feedbunk length. Moreover, each possibility of feed distribution can be carried out for the feed from each of the silos, $S_1$, $S_2$, or $S_3$, or other feed supplies, or any combination thereof, as when different dietary feeds are desired.

It will now be apparent that the present invention provides an improved method for delivering a load or burden to a point of use. Although the apparatus of the invention is constructed from simple and easily obtained components, the end result is a highly flexible and versatile piece of equipment which requires a minimum of personal supervision for its operation and maintenance.

While the foregoing describes a presently preferred embodiment of the invention and several modifications thereof, it is understood that the invention may be practiced in still other forms within the spirit and scope of the following claims.

What is claimed is:

1. Animal feed apparatus comprising an elongated feedbunk, a continuous delivery belt adapted to move generally lengthwise of the feedbunk and transport the animal feed, a substantially vertical baffle partition extending from below the belt to the feedbunk and running substantially the length thereof to define on opposite sides thereof animal feed sections, baffles mounted with respect to the feedbunk and carried on opposite sides of the delivery belt simultaneously to diminish loss of animal feed and prevent entry of animals into the feedbunk, a plow adapted for sliding engagement with respect to the belt, and means to move the plow relatively to the belt to laterally discharge the animal feed therefrom and into the animal feed sections.

2. In the method of carrying animal feed material by a continuous belt moving longitudinally of a feedbunk, the improvement of uniformly discharging the feed material laterally of the belt into the feedbunk by the steps of: positioning a plow over the belt in a position to contact the feed material thereon, moving the plow from a starting point for a preselected distance longitudinally of the belt and in the direction of movement thereof but at a lagging speed to contact the feed material and discharge it laterally of the belt, and reversing the direction of movement of the plow at the terminus of said preselected distance and moving the plow against the direction of travel of the belt back toward said starting point while continuing to contact the feed material with the plow to discharge the material laterally of the belt.

3. The method improvement of claim 2 further including the steps of angularly positioning the plow with respect to its direction of travel to facilitate said lateral discharge of the feed material from the belt, and periodically reversing said angular position of the plow so to discharge from alternate sides of the belt.

4. Material distributing apparatus including an elongated receiving chamber, a continuous belt having a load carrying reach mounted for movement generally centrally above and longitudinally of said receiving chamber, a diverter positioned over and in sliding engagement with the load carrying reach of the belt for contacting the load and deflecting it laterally off of the belt into said chamber, and means to reciprocate the diverter longitudinally of the load carrying reach of the belt at such speeds relative to that of the belt that the diverter, in both directions of its movement, continuously deflects the load laterally into the chamber, said load carrying reach of the belt being uninterruptedly planar over the path of travel of the diverter, said diverter being pivoted about a vertical axis to selectively position the diverter for deflecting the load off of either side of the belt.

5. The apparatus of claim 4 wherein said diverter comprises a plow angularly positioned with respect to its direction of travel to facilitate the lateral deflection of the load.

6. The apparatus of claim 4 wherein said diverter comprises a pivotally mounted plow normally angularly disposed with respect to its direction of travel for laterally deflecting the load, and further including means selectively operative periodically to pivot said plow to a different angular position for alternately deflecting the load to different sides of the belt.

7. In combination with an elongated animal feedbunk having a continuous delivery belt running generally lengthwise thereof for carrying animal feed; an improved discharge means comprising a plow positioned over and sufficiently close to the belt to contact the animal feed, said plow being angularly positioned with respect to the length of the belt to divert and discharge the feed laterally thereof, power means to move the belt in said lengthwise direction and move the plow from a starting point longitudinally of the belt in the direction of its movement for a preselected distance to a terminal point but at a slower speed to engage the animal feed and discharge it laterally of the belt and then to move the plow in the reverse direction back toward said starting point while the plow continues to engage and discharge the feed laterally of the belt, thereby effecting a continuous discharge of the animal feed throughout said preselected distance.

8. The apparatus of claim 7 wherein the power means to move the plow includes a line attached to the ends of the plow, a driving pulley and a second pulley at opposite ends of the feedbunk around which said line is trained, reversible electric power means effective to rotate the driving pulley selectively in opposite directions and thereby reversibly move the line and plow through said preselected distance, a rotatable disc, drive means for reversibly rotating the disc according to the direction and rate of travel of the plow so that one revolution or less of the disc corresponds to said preselected distance, switch actuating means on the periphery of the disc, and switch means adjacent said periphery engageable by said actuating means and actuatable to reverse said power means, whereby successive engagements of the switch actuating means with the switch means reverse the direction of rotation of the disc and said electric power means.

9. The apparatus of claim 7 wherein the power means to move the plow includes a line attached to the ends of the plow, a pulley and capstan at opposite ends of the feedbunk around which said line is trained, reversible electric means effective to rotate the capstan selectively in opposite directions and thereby reversibly move the plow through said preselected distance, and control means to effect such reversals optionally and at varying intervals, said control means comprising a rotatable disc, said line having a driving connection from the capstan with said rotatable disc, switch actuators adjustably spaced about the circumference of said disc, reversible electric circuitry for the reversible electric means responsive to switch means positioned adjacent the circumference of the disc and engageable by the switch actuators, whereby unidirectional rotation of said disc and unidirectional movement of said plow continue until a switch actuator on the rotatable disc engages a switch means for reversing the rotation of the disc and movement of the plow.

10. In a live-stock feeder, an elongated feedbunk accessible on one side to feeding live stock, a belt conveyor extending along the opposite side of said feedbunk in such position that loose feed discharged laterally from a side of the conveyor adjacent said feedbunk will fall into the feedbunk, deflector means including an obliquely disposed plow for engaging said loose feed and deflecting it laterally from the conveyor and into said feedbunk, means for moving said deflecting means back and forth longitudinally of the conveyor to vary the point of discharge of the feed, and baffle means at the discharge side of the conveyor for shielding the conveyor and the deflecting means from wind and live stock, said baffle means being spaced laterally from said conveyor and deflecting means to overhang said feedbunk to permit said lateral discharge of feed into said feedbunk.

11. In a live-stock feeder, a belt conveyor, feedbunks extending longitudinally of said conveyor and respectively positioned to receive feed discharged from opposite sides of the conveyor, a carriage movable longitudinally of the conveyor, angularly disposed deflecting means mounted on said carriage for deflecting feed laterally from the conveyor and into said bunks, and power operated means operative to move said carriage back and forth along the conveyor, said deflecting means being selectively shiftable from one angular position for deflecting feed from one side of the conveyor into one of said feedbunks to a different angular position for deflecting feed from the other side of said conveyor into the other of said feedbunks.

12. A live-stock feeder as set forth in claim 11 wherein said deflecting means comprises a feed engaging vane adjustably mounted on said carriage for adjustment alternatively into either of two oppositely oblique positions for reversing the lateral direction of feed discharge from said conveyor, and means for releasably retaining said vane in either of its oblique positions.

13. The apparatus of claim 12 with the addition of means operative at a predetermined point in the travel of said carriage for reversing the position of said vane.

14. The apparatus of claim 11 wherein said feedbunk defines a trough extending longitudinally of the belt to receive the animal feed, vertically extending posts spaced along the length of the trough, belt-supporting means supported by the posts and comprising a housing, an upper surface of the housing underlying an upper flight of the belt, supports extending internally across the housing between sides thereof and carrying a lower, return flight of the belt, a substantially vertical baffle-partition extending from the housing to the trough and running substantially the length of the trough and centrally thereof to define and separate opposite feeding sides thereof, and upper baffles mounted along opposite sides of the belt for shielding the belt and its contents for both animals and wind.

15. The apparatus of claim 11 wherein the power means to move the carriage includes a line attached to the carriage, pulleys around which the line is trained, and means to reversibly drive at least one of said pulleys to effect reversible movement of the line and carriage.

16. The apparatus of claim 11 wherein the power means to move the carriage includes a line attached to the carriage, spaced pulleys around which the line is trained, and reversible drive means for selectively driving at least one of the pulleys in opposite directions to effect reversible movement of the line and carriage, and regulatory means to reverse said drive means at points along the path of carriage travel.

17. The apparatus of claim 11 wherein the power means to move the carriage includes a line attached to the carriage, a pulley and capstan at opposite ends of the feedbunks around which said line is trained, reversible electric means effective to rotate the capstan selectively in opposite directions and thereby reversibly move the line and carriage through a preselected distance, a rotatable element driven by said reversible electric means, and means responsive to the direction and extent of the rotation of said rotatable element to operate said reversible electric means and move the carriage in a desired direction for a predetermined portion of said preselected distance.

18. In combination with an elongated animal feedbunk, a continuous delivery belt disposed and powered to run generally lengthwise of the feedbunk for carrying animal feed thereto, said delivery belt comprising a continuously planar discharge reach that is substantially coextensive with the length of the feedbunk, and discharge means comprising a plow positioned over and having a lower edge in sliding engagement with the discharge reach of the belt, said lower edge of the plow extending obliquely across the belt to divert and discharge feed laterally therefrom, power means operative first to move the plow in the direction of belt movement from a first selected point to a second selected point along said discharge reach, but at a slower speed than the belt so as to discharge feed from the belt during such movement, and then to move the plow in the reverse direction back to said first selected point for continuing to discharge feed from the belt, and control means adjustable for varying the locations of said first and second selected points along said discharge reach and operative to reverse the direction of travel of the plow each time it reaches either of said points.

19. The apparatus of claim 18, including a line attached to opposite ends of the plow, a driving pulley adjacent one end of the feedbunk, and another pulley adjacent the opposite end of the feedbunk, said line being trained from said plow around both of said pulleys and back to said plow for driving the plow back and forth between said pulleys, said power means being reversible and connected to said driving pulley for reversibly rotating it to reversibly drive said line and plow, and said control means operating to reverse said power means each time the plow reaches either of said first and second selected points along said discharge reach of said delivery belt.

20. The apparatus of claim 7 wherein the power means to move the plow includes a line attached to the ends of the plow, a driving pulley and a second pulley adjacent opposite ends of the feedbunk around which said line is trained, a reversible motor operative to rotate the driving pulley selectively in opposite directions and thereby reversibly move the line and plow through said preselected distance, and control means responsive to arrival of said plow at said starting point and at said terminal point for reversing said motor and thereby reversing the direction of movement of the plow.

21. The apparatus of claim 7 wherein the power means to move the plow includes a line attached to the ends of the plow, a driving pulley and a second pulley adjacent opposite ends of the feedbunk around which said line is trained, reversible electric power means effective to rotate the driving pulley selectively in opposite directions and thereby reversibly move the line and plow through said preselected distance, a rotatable disc, driving means for reversibly rotating the disc according to the direction and rate of travel of the plow, switch means actuatable to reverse said electric power means, and switch actuating means responsive to rotation of said disc through predetermined angles in either direction for actuating said switch means to reverse said electric power means.

22. Animal feed apparatus comprising an elongated feed trough, feed conveyor means extending longitudinally of and substantially centrally above the trough, discharge means associated with said conveyor means for discharging feed therefrom substantially uniformly along the length of the trough, said discharge means being selectively operable to discharge feed laterally and downwardly into the trough from either side of said conveyor means, a partition extending longitudinally and substantially centrally of the trough and from the bottom thereof substantially up to said conveyor means, the conveyor means laterally overhanging said partition on both sides thereof, and baffles extending longitudinally of and above the trough on opposite sides of said conveyor means, said baffles extending from below to above a feed discharge level of said conveyor means and being spaced laterally outwardly therefrom to permit lateral discharge of feed between the conveyor means and the baffles on either side thereof while shielding the conveyor means from wind and livestock.

23. Animal feed apparatus comprising an elongated feedbunk, a continuous delivery belt disposed above the feedbunk for transporting animal feed longitudinally of the feedbunk over the length thereof, baffles mounted above the feedbunk on opposite sides of the delivery belt and extending from below to above a feed discharge level of the belt, said baffles also extending longitudinally of the delivery belt in laterally spaced relationship therewith for shielding the belt and a feed burden thereon while permitting lateral and downward discharge of feed from the belt on either side thereof between the belt and the baffles, and discharge means associated with the delivery belt and operative for laterally discharging feed therefrom continuously along the length of the feedbunk and selectively from either side of the belt.

24. Animal feed apparatus according to claim 23, including a partition extending longitudinally and generally centrally of the feedbunk from the bottom thereof upwardly to substantially the height of the lower edge of said baffles so as to divide the feedbunk into opposite, longitudinally extending compartments that respectively receive and retain feed discharged from opposite sides of the belt.

25. In a livestock feeder an elongated trough defined by a longitudinal bottom portion between laterally spaced upstanding side walls, a vertical partition extending longitudinally within said trough from said bottom portion to a height greater than the height of said side walls dividing said trough into two compartments, belt conveying means substantially contiguous with the upper edge of said partition having a lateral width greater than the width of said partition, said conveyor means being operable to discharge feed laterally over its edges for discharging feed longitudinally of the trough into both of said compartments, a baffle extending longitudinally along each side of said conveyor means laterally spaced therefrom to cooperate with said conveyor means to define a vertically extending longitudinal opening along each edge of said conveyor means along which feed is free to fall into the associated compartment, each longitudinal opening being located inwardly from the associated side wall, said baffles extending from a position above said conveyor means to a lower edge at least as low as the upper edge of said partition, said baffles cooperating with said partition and conveyor means to prevent wind from freely blowing across said trough so that feed is not lost as it drops free from said conveyor means into said trough.

26. In a livestock feeder as set forth in claim 25 a combination wherein a roof is positioned over and across said baffles cooperating with said baffles to enclose said conveyor belt means.

(References on following page)

References Cited by the Examiner

UNITED STATES PATENTS

| | | | |
|---|---|---|---|
| 805,625 | 11/1905 | Blank | 198—188 X |
| 1,481,542 | 1/1924 | Dunsieth | 198—188 X |
| 2,522,449 | 9/1950 | Inman | 119—52 |
| 2,841,115 | 7/1958 | Weber | 119—52 |
| 2,867,314 | 1/1959 | Hansen | 119—52 X |
| 2,970,568 | 2/1961 | Johnson | 119—52 |
| 3,153,477 | 10/1964 | Tipton | 198—185 |

SAMUEL KOREN, *Primary Examiner.*

HUGH R. CHAMBLEE, *Examiner.*